Oct. 30, 1962 W. HANSON, JR 3,061,076
CONVEYOR APPARATUS
Filed Oct. 31, 1958
FIG.I.
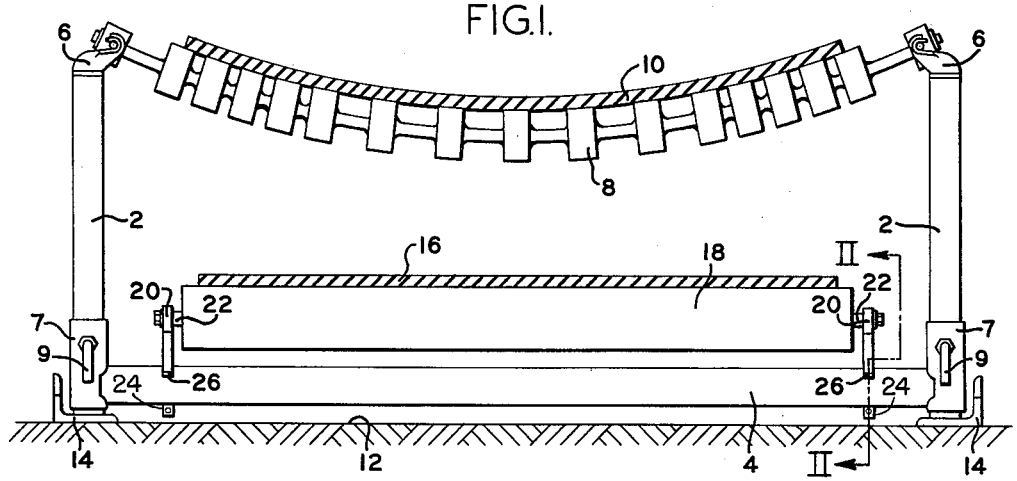
FIG. 2.
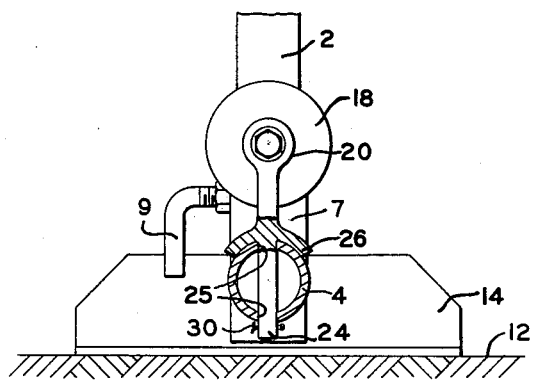
INVENTOR.
WILLIAM HANSON, JR.
BY
ATTORNEY

3,061,076
CONVEYOR APPARATUS
William Hanson, Jr., Dover, Ohio, assignor to Joy Manufacturing Company, Pittsburgh, Pa., a corporation of Pennsylvania
Filed Oct. 31, 1958, Ser. No. 771,034
9 Claims. (Cl. 198—184)

This invention relates to conveyor apparatus and more particularly to an idler roller structure for supporting a movable conveyor belt.

At the present time it is common practice to support the return run of a movable conveyor belt by means of idler rollers which are removably supported by brackets extending upwardly from a support pipe. With such a structure removal of the idler roller permits the brackets to extend upwardly into the path of travel of the conveyor belt whereby the belt may be damaged thereby.

Accordingly, one object of this invention is to provide new and improved conveyor apparatus comprising an idler roller having mounting means secured thereto which roller and mounting means may readily be secured to or removed from a supporting device.

A specific object of this invention is to provide a new and improved return idler having supporting means secured to the ends thereof which supporting means have formed pin elements slidably engageable with a support pipe to support the idler thereabove.

These and other objects of this invention will become more apparent upon consideration of the following detailed description of a preferred embodiment thereof, when taken in conjunction with the following drawings, in which:

FIG. 1 is a front elevational view of a support stand having an idler roller therein constructed in accordance with the principles of this invention, and FIG. 2 is an end elevation view of the idler roller as shown in FIG. 1 taken along the line II—II thereof with the conveyor belt omitted therefrom.

Referring to FIG. 1 it will be noted that a support stand with which the structure of this invention cooperates, comprises a pair of vertically extending side supports 2 which are held in rigid spaced relationship by means of a cross brace 4 extending horizontally therebetween adjacent the lower ends thereof. The upper end of each support 2 is provided with suitable bracket means 6 for suitably supporting a suitable idler member 8 therebetween over which the load carrying run 10 of belting extends (see for example the copending application of George Baechli, Ser. No. 732,697, filed May 2, 1958, now abandoned, which application has been assigned to the same assignee as the assignee of this invention). As is customary, the supports 2 and the cross brace 4 are formed from suitable pipes with the cross brace 4 being spaced below the idler member 8 and above the surface 12 over which it is desired to convey material. As is also customary the supports 2 are provided with suitable foot pads 14 which engage the surface 12. As shown, a suitable vertically extending guide pipe 7 is suitably rigidly secured to each end of the cross brace 4 which is vertically slidable over the outer surface of the supports 2, respectively. Each guide pipe 7 is provided with suitable locking means such as handles 9 which suitably cooperate with the supports 2, respectively, to locate the cross brace 4 at any desired height above the surface 12.

As shown, a return run 16 of belting travels over the upper surface of a return idler roller 18 which is secured to the upper portion of the cross brace 4 so that its upper belt engaging surface is located below the lower surface of the idler member 8 when the run 10 is carrying its maximum load. For the purpose of this invention the idler roller 18 may be of any suitable construction as is well known in the art. In general, such return idlers 18 comprise an elongated cylinder having a shaft 22 extending therethrough or if desired, stub shafts (not shown) which extend outwardly from each end thereof.

A return idler support is provided at each end of the return roller 18 for rotatably supporting the roller 18 above the cross brace 4. As shown in FIG. 2, each idler support comprises an upper eye portion 20 which is closely received on the ends of the shaft 22 to permit the shaft 22 to rotate therein. If desired, the eye portions 20 may be provided with suitable bearing means as is well known in the art to facilitate such rotational support of the shaft 22. After the eye portions 20 have been inserted over the ends of the shaft 22 suitable means, such as the washer and nut assembly shown, may be provided on the outer ends of the shaft 22 to prevent the shaft 22 from sliding longitudinally out of the eye portions 20.

Each idler support has an integral elongated cylindrical stem portion 24 extending downwardly from the eye portion 20 each of which is closely received in vertically aligned circular openings 25 in diametrically opposed portions of the cross brace 4. Each idler support is also provided with a pair of projections 26 which extend laterally from opposite sides of the stem portion 24, intermediate the ends thereof. The under surface of the projections 26 engage the upper surface of the cross brace 4 whereby the rotative axis of the roller 18 is located at its desired elevation above the cross brace 4. Accordingly, only a single lateral projection need be provided for such purpose, however, as shown a pair of diametrically opposed projections are preferred to provide stability to the roller 18. In addition the projections 26 are of a length to provide an elongated under surface which is concave in form to closely engage an elongated portion of the outer surface of the cross brace 4 and extend parallel to the travel of the return run 16 whereby the idler roller 18 is rigidly held against lateral movement with respect to the cross brace 4.

Thus it will be noted that I have provided an inexpensive structure whereby the return idler roller 18 may easily be inserted or removed from the cross brace 4 and upon its removal the return run of the belt may travel over the upper surface of the cross pipe 4 without danger of engaging any means for supporting the idler roller 18. The idler roller 18 may easily be inserted at any time by merely aligning the stem portions 24 with the horizontally spaced vertically aligned openings 25 in the cross brace 4 and thereafter inserting the stem portions 24 through the openings 25 until the under surfaces of the projections 26 engage the upper surface of the cross brace 4. As shown the stem portions 24 extend completely through the cross brace 4 to additionally prevent twisting of the idler supports around the axis of the cross brace 4. Although as indicated the cross brace 4 is normally formed from a pipe it is to be realized that such form of cross brace 4 is not essential for the purpose of this invention. With other forms of cross braces, however, it will be necessary that the projections 26 be provided with a different form of under surface so as to engage the upper surface of the particular form of cross brace employed.

Nor is it essential that the stem portions be cylindrical as any form desired may be employed, however the openings 25 must be of a cooperative form to closely receive the stem portions 24 therein. If desired the lower end of the stem portions 24 may be provided with some suitable means, such as a through opening to permit insertions of a cotter pin 30 therethrough, whereby accidental removal of the idler roller is prevented. The improved stand of this invention may be used with various types of conveyor apparatus, either of the rigid or flexible support types, and it is not desired to limit the invention to any particular type of conveyor structure. While the improved idler roller support is disclosed for use with the return run of an endless conveyor belt, it may be associated with any desired type of idler roller or roller guide structure. By arranging the idler roller directly above the cross brace or bar, with the longitudinal axes of the roller and the cross bar lying in a common vertical plane not only is clogging with dirt avoided but also a well balanced structure results.

Having described a preferred embodiment of this invention in accordance with the patent statutes it is to be realized that modification thereof may be made without departing from the broad spirit and scope of the invention. Accordingly it is respectfully requested that this invention be interpreted as broadly as possible and be limited only by the prior art.

What I claim as new and desire to secure by Letters Patent is:

1. Conveyor apparatus comprising, an elongated roller having means captively secured to the ends thereof, respectively, said captively secured means extending laterally of said roller with the outer ends thereof being laterally spaced outwardly from the outer periphery of said roller, said outer ends of said captively secured means being adapted to be slidably inserted into a supporting means, and means on such captively secured means engageable with said supporting means to locate said captively secured means and permit said roller to rotate in spaced relationship from such supporting means.

2. Conveyor apparatus comprising, a roller having shaft means extending axially from the ends thereof, roller supports secured to said shaft means, respectively, to permit rotation of said roller about an axis extending therebetween, each of said roller supports having a portion extending radially with respect to said axis beyond the outer periphery of said roller, a stationary support spaced laterally from said shaft means, said stationary support having spaced recessed openings therein for slidably receiving the free ends of said radially extending portions of said roller supports, respectively, and means on said roller supports spaced inwardly from said free ends engageable with the outer surface of said stationary support adjacent said roller for limiting the insertion of said radially extending portions of said roller supports within said openings.

3. Conveyor apparatus comprising, a roller having shaft means extending axially from the ends thereof, roller supports secured to said shaft means, respectively, to permit rotation of said roller about an axis extending therebetween, each of said roller supports having a portion extending radially with respect to said axis beyond the outer periphery of said roller, a stationary support spaced laterally from said shaft means, said stationary suport having spaced means extending inwardly thereof for slidably receiving the free ends of said radially extending portions of said roller supports, respectively, and said roller supports including means engageable with means on said stationary support for locating said roller supports with respect to said stationary support.

4. Conveyor apparatus comprising, an elongated roller having shaft means extending axially from the ends thereof, roller supports secured to said shaft means, respectively, to permit rotation of said roller therebetween, each of said roller supports having an elongated portion extending laterally beyond the outer periphery of said roller, an elongated stationary support having a longitudinal axis thereof laterally spaced from the longitudinal axis of said roller, said stationary support having axially spaced openings extending transversely inwardly thereof for slidably receiving said elongated portions of said roller supports, respectively, and means on said roller supports spaced inwardly from the outer ends of said elongated portions engageable with the outer surface of said stationary support adjacent said roller for limiting the insertion of said elongated portions within said openings.

5. Conveyor apparatus comprising, an elongated roller having shaft means extending axially from the ends thereof, roller supports secured to said shaft means, respectively, to permit rotation of said roller therebetween, each of said roller supports having an elongated portion extending laterally beyond the outer periphery of said roller, an elongated stationary support having a longitudinal axis thereof laterally spaced from the longitudinal axis of said roller, said stationary support having axially spaced openings extending inwardly thereof for slidably receiving said elongated portions of said roller supports, respectively, and means on said roller supports extending laterally therefrom to limit the insertion of said elongated portions within said openings.

6. Conveyor apparatus comprising, an elongated roller having shaft means extending axially from the ends thereof, roller supports secured to said shaft means, respectively, to permit rotation of said roller therebetween, each of said roller supports having an elongated cylindrical pin portion extending laterally beyond the outer periphery of said roller, an elongated stationary support having a longitudinal axis thereof laterally spaced from the longitudinal axis of said roller, said stationary support having axially spaced openings extending transversely therethrough for slidably receiving said pin portions of said roller supports, respectively, and means on said roller supports extending laterally therefrom to limit the insertion of said pin portions within said openings.

7. Conveyor apparatus comprising, an elongated roller having shaft means extending axially from the ends thereof, roller supports secured to said shaft means, respectively, to permit rotation of said roller therebetween, each of said roller supports having an elongated cylindrical pin portion extending laterally beyond the outer periphery of said roller, an elongated stationary support having a longitudinal axis thereof laterally spaced from the longitudinal axis of said roller, said stationary support having axially spaced openings extending transversely therethrough for slidably receiving said pin portions of said roller supports, respectively, and means on said roller supports spaced inwardly from the outer ends of said pin portions engageable with the outer surface of said stationary support adjacent said roller for limiting the insertion of said pin portions within said openings.

8. Conveyor apparatus comprising, an elongated roller having shaft means extending axially from the ends thereof, roller supports secured to said shaft means, respectively, to permit rotation of said roller therebetween, each of said roller supports having an elongated cylindrical pin portion extending laterally beyond the outer periphery of said roller, a stationary tubular support having axially spaced openings extending diametrically therethrough for receiving said pin portions therein, and means on said roller supports engageable with the outer surface of said tubular support to locate said roller with respect to said tubular support.

9. Conveyor apparatus comprising, an elongated roller having shaft means extending axially from the ends thereof, roller supports secured to said shaft means, respectively, to permit rotation of said roller therebetween, each of said roller supports having an elongated cylindrical pin portion extending laterally beyond the outer periphery of said roller, a stationary tubular support having axially spaced openings extending diametrically therethrough for receiving said pin portions therein, and integral means on said roller support extending laterally of said pin portions having an arcuate undersurface engageable with the outer surface of said tubular support to locate said roller with respect to said tubular support.

References Cited in the file of this patent

UNITED STATES PATENTS

| | | |
|---|---|---|
| 1,756,389 | Schneider | Apr. 29, 1930 |
| 2,805,763 | McCallum | Sept. 10, 1957 |
| 2,831,644 | Tillung | Apr. 22, 1958 |
| 2,868,355 | McCann | Jan. 13, 1959 |
| 2,872,774 | Fink | Feb. 10, 1959 |

FOREIGN PATENTS

| | | |
|---|---|---|
| 582,393 | Great Britain | Nov. 13, 1946 |